United States Patent
Klement

(10) Patent No.: US 6,669,416 B2
(45) Date of Patent: Dec. 30, 2003

(54) DRIVING HEAD FOR THE NUMERICALLY CONTROLLED SETTING MOVEMENTS OF A TOOL SPINDLE OR WORKPIECE TABLE AROUND AT LEAST ONE AXIS OF ROTATION

(75) Inventor: Klaus Klement, Jülich (DE)

(73) Assignee: Cytec Zylindertechnik GmbH, Julich (DE)

( * ) Notice: Subject to any disclaimer, the term of this patent is extended or adjusted under 35 U.S.C. 154(b) by 134 days.

(21) Appl. No.: 10/057,437

(22) Filed: Jan. 25, 2002

(65) Prior Publication Data

US 2002/0114678 A1 Aug. 22, 2002

(30) Foreign Application Priority Data

Feb. 2, 2001 (DE) .......................... 101 04 669

(51) Int. Cl.⁷ ................................. B23C 1/12
(52) U.S. Cl. .................... 409/201; 409/216; 74/813 L; 310/67 R; 310/191; 310/156.25
(58) Field of Search ................. 409/216, 201, 409/204, 211, 215, 224, 235, 231, 210; 408/236, 237; 74/813 R, 813 L; 310/67 R, 191, 156.25; 29/33 J, 48.5 A, 48.5 R

(56) References Cited

U.S. PATENT DOCUMENTS

| | | | |
|---|---|---|---|
| 4,943,748 A | * 7/1990 | Shiozawa | 310/67 R |
| 5,234,081 A | * 8/1993 | Watanabe | 188/74 |
| 5,584,621 A | * 12/1996 | Bertsche et al. | 409/201 |
| 5,850,770 A | * 12/1998 | Rehage | 82/142 |
| 2001/0046423 A1 | * 11/2001 | Colombo | 409/211 |
| 2002/0170397 A1 | * 11/2002 | Sauter et al. | 82/159 |

FOREIGN PATENT DOCUMENTS

| | | |
|---|---|---|
| DE | 41 22 711 | 2/1992 |
| DE | 195 22 711 | 1/1997 |
| EP | 0 749 803 | 1/1996 |
| JP | 5-38607 A * | 2/1993 |
| WO | 96/41695 | 12/1996 |

* cited by examiner

Primary Examiner—A. L. Wellington
Assistant Examiner—Erica Cadigan
(74) Attorney, Agent, or Firm—Collard & Roe, P.C.

(57) ABSTRACT

A driving head for the numerically controlled setting movements of a tool spindle or workpiece table around at least one axis of rotation. The basic structure of the driving head comprises a housing (1, 1') and at least one multi-pole external rotor motor (2) arranged concentrically in relation to the axis of rotation (A, B). The rotor motor is comprised of a ring-shaped, soft-magnetic stator (3) with single-pole windings, which is inserted in the housing (1, 1'); as well as a ring-shaped rotor yoke (5) fitted with permanent magnets (4) On the end side, the rotor yoke (5) is connected to a rotor body (6), which is rotatably supported in the housing (1, 1'). Furthermore, the rotor yoke is arranged between the stator (3) and a segment of the housing that comprises a device (7) for blocking the rotor yoke (5). The device (7) for blocking the rotor yoke preferably consists of a deformable diaphragm (8) acted upon by fluid and placed against the rotor yoke (5) under the pressure of the fluid.

5 Claims, 2 Drawing Sheets

DRIVING HEAD FOR THE NUMERICALLY CONTROLLED SETTING MOVEMENTS OF A TOOL SPINDLE OR WORKPIECE TABLE AROUND AT LEAST ONE AXIS OF ROTATION

BACKGROUND

The invention relates to a driving head for the numerically controlled setting (or adjusting) movements of a tool spindle or workpiece table around at least one axis of rotation.

A two-axis driving head that has direct drives in the form of a forked head is described in WO 96/41695. The drives are designed as inside rotor motors. The rotors, which comprise several components, can be blocked by groove-and-spring elements that can be adjusted in the axial direction. The known design has several drawbacks. For example, in a driving head with a compact structure, the passage provided for medium conduits is small. These conduits are connected to a tool spindle that is pivot-mounted between the arms of the fork. Furthermore, the driving torque, which is dependent on the type of construction used, is insufficient for practical use. Finally, the rotor was not properly blocked when in a preset position.

DE 41 22 711 A1 describes a clamping device for a driving shaft on a stepping table or device of a numerically controlled machine tool. The device comprises a clamping sleeve acted upon by fluid. The clamping sleeve can be radially deformed and pressed against the peripheral surface of the driving shaft. There is also a retaining device for the workpiece spindle of a turning machine. This retaining device comprises a brake disk, with bending elasticity in the direction of the axis of the spindle, that can be pressed against a plane surface of the spindle housing (DE 195 22 711 C2; EP 0 749 803 A1).

SUMMARY

The invention is a driving head for numerically controlled setting movements having a simple compact structure and the ability to perform precise adjusting movements with high driving torque.

The driving head for the numerically controlled setting movements of a tool spindle or workpiece table around at least one axis of rotation comprises a housing and at least one multi-pole external rotor motor, arranged concentrically in relation to the axis of rotation. Each external rotor motor comprises a ring-shaped, soft-magnetic stator with single-pole windings installed in the housing, and a ring-shaped rotor yoke that is fitted with permanent magnets.

The rotor yoke is connected on its end side to a rotor body that is rotatably supported in the housing. The rotor yoke is arranged between the stator and a segment of the housing that comprises a device for blocking the rotor yoke. The blocking device comprises a deformable diaphragm that is acted upon by fluid and is placed (or driven) against the rotor yoke under the pressure of the fluid. The driving head as defined by the invention is suitable for multi-axis machine tools, round tables, pivoting tables and the like.

This embodiment of the invention has a very simple structure. High retaining forces can be achieved by employing a deformable diaphragm that flatly rests against the rotor yoke and over its entire circumference. The diaphragm is secured in the housing with clamping rings. A fluid chamber located between the diaphragm and the housing is sealed with seals arranged in edge segments over which the clamping rings grip.

If the driving head has two axes of rotation, at least one external rotor motor with a ring-shaped rotor yoke is arranged around each axis of rotation. The stator of the external rotor motor, which is arranged concentrically in relation to the second axis of rotation, is arranged in a second housing of the drive. The second housing is connected in a fixed manner with the rotor of the external rotor motor arranged around the first axis of rotation. The second drive housing can be embodied in the form of an angle head piece. Furthermore, the second drive housing can be designed in the form of a two-arm forked head. Synchronously operating external rotor motors are arranged around one axis of rotation in the forked arms. A motor-driven tool spindle can be connected to the rotors of the external rotor motors arranged in the forked arms.

BRIEF DESCRIPTION OF THE DRAWINGS

Other objects and features of the present invention will become apparent from the following detailed description considered in connection with the accompanying drawings which disclose two embodiments of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION

Figure 1:
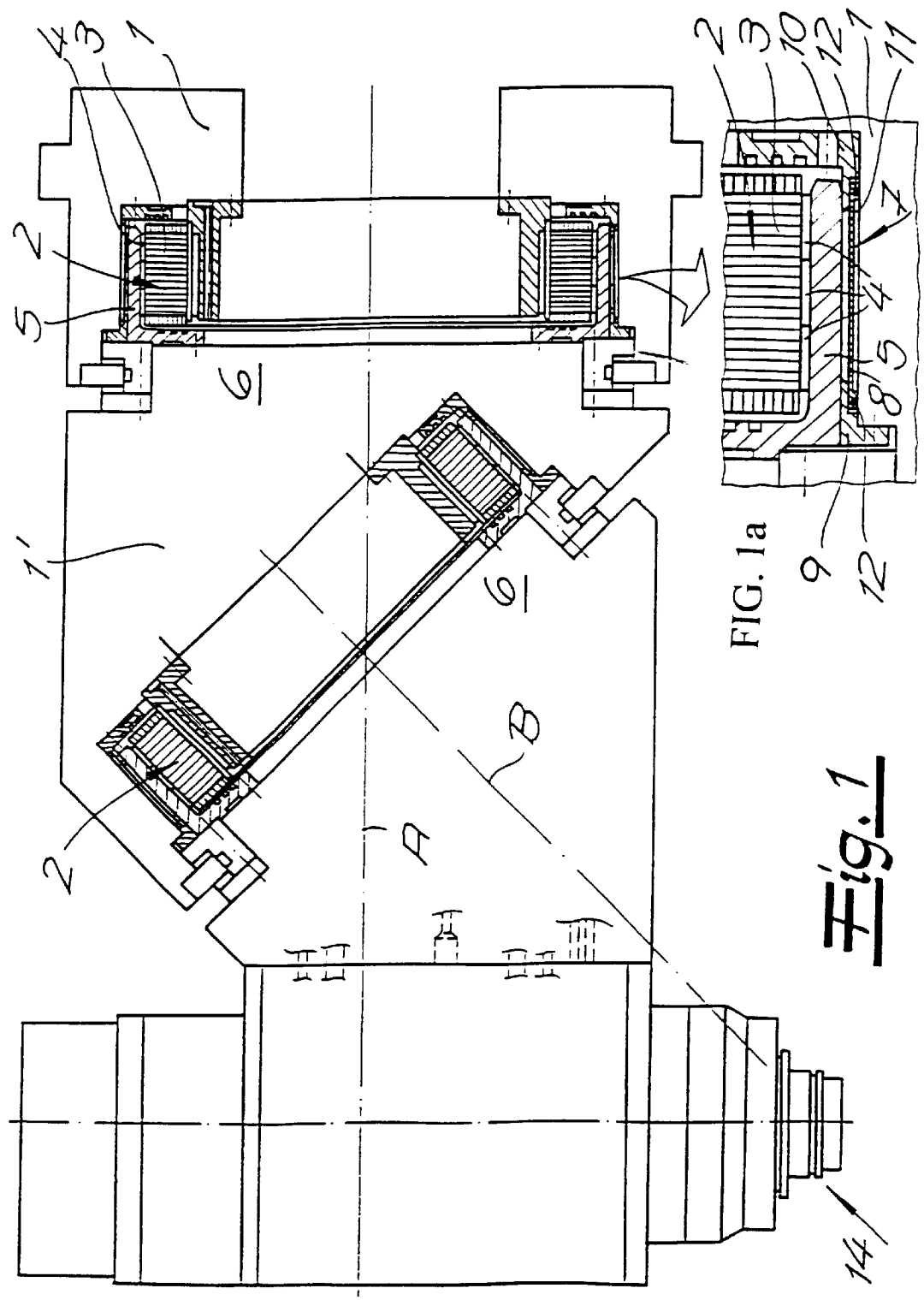
FIG. 1 is a longitudinal section through a driving head for the numerically controlled setting movements of a tool spindle, with a two-axis angle head.

FIG. 1 is a longitudinal section through a driving head for the numerically controlled setting movements of a tool spindle, with a two-axis angle head. The driving head comprises a housing 1, 1' and multi-pole external rotor motors 2 arranged concentrically around two axes of rotation A, B. The rotor motors each comprise a ring-shaped, soft-magnetic stator 3 with single-pole windings inserted in housing 1, 1'; as well as a ring-shaped rotor yoke 5 which is fitted with permanent magnets 4. On its end side, rotor yoke 5 is connected to a rotor body 6 that is rotatably supported in housing 1, 1'. Rotor yoke 5 is arranged between stator 3 and a cylindrical segment of the housing having a device 7 for blocking rotor yoke 5. Device 7 for blocking rotor yoke 5 consists of a deformable diaphragm 8, which is acted upon by fluid and forced against rotor yoke 5 under the pressure of the fluid.

FIGS. 1a, 2a and 2b show that diaphragms 8 are secured in the housing by means of clamping rings 9, 10; and that a fluid chamber 11 is sealed between diaphragm 8 and housing 1, 1' with seals 12, which are arranged in edge segments over which clamping rings 9, 10 grip.

Figure 2:
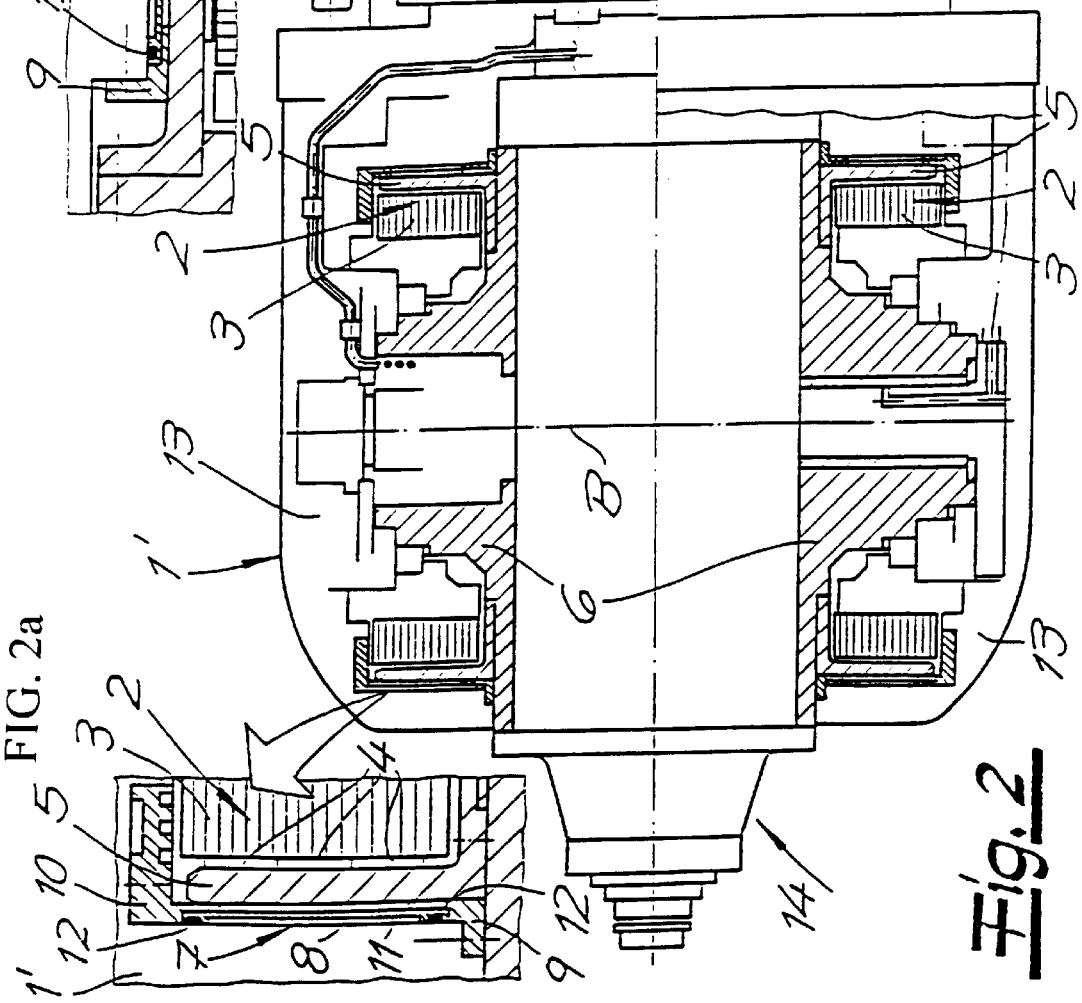
FIG. 2 also is a longitudinal section through a driving head for the numerically controlled setting movements of a tool spindle with a two-axis forked head.

The driving heads shown in FIGS. 1 and 2 each comprise two axes of rotation A, B, whereby at least one external rotor motor 2 having the structure described above is arranged around each axis of rotation A, B. Stator 3 of the external rotor motor 2 is arranged concentrically in relation to second axis of rotation B and in second drive housing 1'. Second drive housing 1' is connected in a fixed manner with rotor 6, of the external rotor motor 2 arranged around first axis of rotation A.

In the embodiment shown in FIG. 2, second drive housing 1' is designed in the form of a two-arm forked head. External rotor motors 2 are arranged in arms 13 of the forked head. Two external rotor motors 2 mounted in arms 13 of the fork are arranged on the same axis of rotation B and are operated synchronously. A motor-driven tool spindle 14 comprising hydraulic tool changing and clamping devices is connected to rotors 6. Rotors 6 of external rotor motors 2 have large-dimensioned openings for passing medium conduits through such holes.

Accordingly, while two embodiments of the present invention have been shown and described, it is to be understood that many changes and modifications may be made thereunto without departing from the spirit and scope of the invention as defined in the appended claims.

What is claimed is:

1. A driving head for the numerically controlled setting movements around at least one axis of rotation of a tool spindle comprising:
    a housing through which the at least one axis of rotation extends; and
    at least one multi-pole external rotor motor arranged concentrically in relation to one axis of rotation and comprising:
        a ring-shaped soft-magnetic stator with single pole windings inserted in said housing;
        a ring-shaped rotor yoke disposed around said ring-shaped soft-magnetic stator, wherein said ring-shaped rotor yoke has an end side;
        permanent magnets fitted between said ring-shaped rotor yoke and said ring-shaped soft-magnetic stator;
        a rotor body connected to said end side of said ring-shaped rotor yoke, wherein said rotor body is rotatably supported in said housing; and
        a deformable diaphragm that is disposed around said rotor yoke under the pressure of fluid for blocking said rotor yoke and forming a blocking device.

2. The driving head according to claim 1, wherein said diaphragm is secured in said housing by means of clamping rings, and whereby a fluid chamber is sealed between said diaphragm and said housing with seals over which said clamping rings grip.

3. The driving head according to claim 1, wherein there are two axes of rotation comprising a first axis and a second axis, and wherein said at least one external rotor motor with said ring-shaped rotor yoke is arranged around each axis of rotation, and wherein said stator of said external rotor motor mounted concentrically in relation to said second axis of rotation is arranged in a second drive housing that is connected in a fixed manner with said rotor of said external rotor motor, which is mounted around said first axis of rotation.

4. The driving head according to claim 3, wherein said second drive housing is designed as an angle head piece.

5. The driving head according to claim 3, wherein said second drive housing is designed in the form of a two-arm forked head, and wherein synchronously operated external rotor motors are arranged on one of said axes of rotation in said forked arms and wherein a motor-driven tool spindle is connected with said rotors of said external rotor motors mounted in said forked arms.

* * * * *